US00RE34018E

United States Patent [19]

Petersen et al.

[11] E Patent Number: Re. 34,018

[45] Reissued Date of Patent: Aug. 4, 1992

[54] HEATING COIL ASSEMBLY

[75] Inventors: Walter J. Petersen, Eden Prairie; John M. Svendsen, New Hope, both of Minn.

[73] Assignee: Wagner Spray Tech Corporation, Minneapolis, Minn.

[21] Appl. No.: 581,420

[22] Filed: Sep. 12, 1990

Related U.S. Patent Documents

Reissue of:

[64] Patent No.: 4,636,617
Issued: Jan. 13, 1987
Appl. No.: 639,371
Filed: Aug. 8, 1984

U.S. Applications:

[63] Continuation of Ser. No. 264,382, Oct. 31, 1988, abandoned.

[51] Int. Cl.[5] ..... H05B 3/00; F24H 3/04; H01C 3/20

[52] U.S. Cl. ..... 338/303; 34/97; 34/243 R; 174/138 J; 219/546; 219/550; 338/268; 338/270; 338/321; 392/379; 392/383; 392/485

[58] Field of Search ..... 219/534, 546, 550; 392/379–385, 485–495, 360–369, 370–376, 480–484; 338/296, 302, 303, 298, 321; 34/96–101, 243 R

[56] References Cited

U.S. PATENT DOCUMENTS

| | | | |
|---|---|---|---|
| 601,585 | 3/1898 | McElroy | 338/303 X |
| 1,387,522 | 8/1921 | Thornton | 392/373 |
| 1,777,744 | 10/1930 | Brever | 392/383 |
| 1,821,525 | 9/1931 | Nielsen | 392/385 |
| 1,839,119 | 12/1931 | Potter | 392/385 X |
| 1,869,737 | 8/1932 | Brever | 392/384 X |
| 1,949,658 | 3/1934 | Remseth et al. | 392/481 X |
| 1,955,240 | 4/1934 | Kenney | 392/384 X |
| 2,041,687 | 5/1936 | Benson | 392/385 |
| 2,267,264 | 12/1941 | Bland | 392/492 X |
| 2,431,620 | 11/1947 | Ries | 392/485 X |
| 2,473,783 | 6/1949 | Brown | 392/373 |
| 2,730,609 | 1/1956 | Constantimesco | 392/485 X |
| 2,778,919 | 1/1957 | Vicario | 392/384 X |
| 3,094,606 | 6/1963 | Ferris | 392/385 X |
| 3,109,083 | 10/1963 | Meltzer | 392/384 X |
| 3,612,824 | 10/1971 | Berryman et al. | 392/383 |
| 3,668,370 | 6/1972 | Pattison | 392/385 |
| 3,857,016 | 12/1974 | Meyer et al. | 392/383 |
| 3,943,329 | 3/1976 | Hlavac | 392/379 |
| 3,947,659 | 3/1976 | Ono | 392/385 X |
| 4,198,556 | 4/1980 | Crowley et al. | 392/385 X |

FOREIGN PATENT DOCUMENTS

| | | | |
|---|---|---|---|
| 205446 | 6/1972 | Fed. Rep. of Germany | 338/303 |
| 124963 | 3/1928 | Switzerland | 338/303 |
| 250103 | 5/1948 | Switzerland . | |
| 591966 | 9/1947 | United Kingdom . | |
| 993320 | 5/1965 | United Kingdom . | |

*Primary Examiner*—Anthony Bartis
*Attorney, Agent, or Firm*—Hill, Van Santen, Steadman & Simpson

[57] ABSTRACT

A heating coil assembly for use in an air blower device has an annular support element, a first end cap, a core having a heating coil spirally wound thereon, a sleeve surrounding the coil and core, and a second end cap. All components have a centrally disposed non-circular bore therein for receiving a heavy gauge non-circular wire retainer, swaged at one end, which extends through the entire assembly and is retained by a press washer at an opposite end. The interior of the sleeve is spaced from the coil forming an axial channel for air flow over the coil. Axial openings in the end caps form air inlets and outlets for the channel. The coil has several leads, at least one of which extends through an axial opening in one of the end caps. The heating coil assembly has a small number of components, which are easily assembled and simultaneously axially and radially positioned and retained relative to each other by the wire retainer.

35 Claims, 1 Drawing Sheet

HEATING COIL ASSEMBLY

Matter enclosed in heavy brackets [ ] appears in the original patent but forms no part of this reissue specification; matter printed in italics indicates the additions made by reissue.

*This is a continuation of application Ser. No. 264,382 filed Oct. 31, 1988, now abandoned.*

BACKGROUND OF THE INVENTION

1. Field of the Invention

The present invention relates to heating coil assemblies, and in particular to a heating coil assembly suitable for use in a heavy duty hot air blower.

2 Description of the Prior Art

Heating coil assemblies are known in the art for use in various types of hot air blowing devices, such as paint-removing blowers, hair dryers and the like. Conventional heating coil assemblies are generally positioned adjacent to a blower fan and have a resistance heating element, generally in the form of a coil wire, disposed such that the blower moves air to be heated axially over the coil, such that when the air exits the assembly it has been elevated in temperature by the coil.

Many conventional units simply have the coil, and supporting means therefor, disposed openly within the housing of the blower device, such that the air passage surrounding the coil is a relatively large volume defined by the coil itself and the interior wall of the housing. Examples of such conventional devices are described in U.S. Pat. Nos. 3,943,329; 3,947,659; 3,109,083; 2,778,919; 2,730,609; 2,041,687; 1,955,240; 1,821,525 and 1,777,744.

Other known heating coil assemblies have a sleeve or other interior means surrounding the coil in the inside of the device housing, so as to define a smaller volume for passage of air over the coils. Examples of devices of this type are described in U.S. Pat. Nos. 4,198,556; 3,857,016; 3,668,370; 3,612,824 and 3,094,606.

A problem existing in the field of heating coil assembly manufacture is that of providing a reliable heating means which can be utilized for purposes requiring a sufficient volume of extremely hot air, such as for removing paint from a surface by causing the paint to blister by the application of intense heat thereto, is that of providing a heating element which meets these demands which is inexpensive, easy to assembly, and has relatively few elements. A further problem in the design and manufacture of such heavy duty heating elements is to provide such an element which generates sufficient heat for elevating the temperature of a large volume of air but which is sufficiently insulated from the remainder of the device so as to not cause a danger to the user.

SUMMARY OF THE INVENTION

It is an object of the present invention to provide a heating coil assembly for use in a heavy duty hot air blowing device which consists of a small number of elements which are easily assembled and retained.

It is a further object of the present invention to provide a means for assemblying the heating coil assembly which simultaneously axially and radially positions and retains the elements thereof.

It is a further object of the present invention to provide such a heating coil assembly which rapidly and effectively elevates the temperature of a high volume of moving air yet provides sufficient insulation from surrounding components so as to minimize heat transfer thereto, thereby contributing to safer operation of the device containing the assembly.

The above objects are inventively achieved in a heating coil assembly having an annular mounting element, which may be comprised of plastic, and two ceramic end faces with a ceramic core about which a resistance heating element is spirally wound and a ceramic sleeve disposed therebetween. Each element has a polygonal centrally disposed bore therein for receiving a heavy gauge polygonal wire retainer therethrough. The retainer is swaged at one end and is fitted with a press fit washer at its opposite end for simultaneously axially and radially positioning and retaining all of the elements, and further facilitating ease of assembly of the elements.

Each of the end faces which are disposed adjacent the insulating sleeve surrounding the heating element have vanes extending toward the interior of the sleeve which are received in the sleeve so as to form in combination a cylindrical insulating shell for the heating element.

DESCRIPTION OF THE PREFERRED EMBODIMENTS

Figures 1, 2, 3, 4:
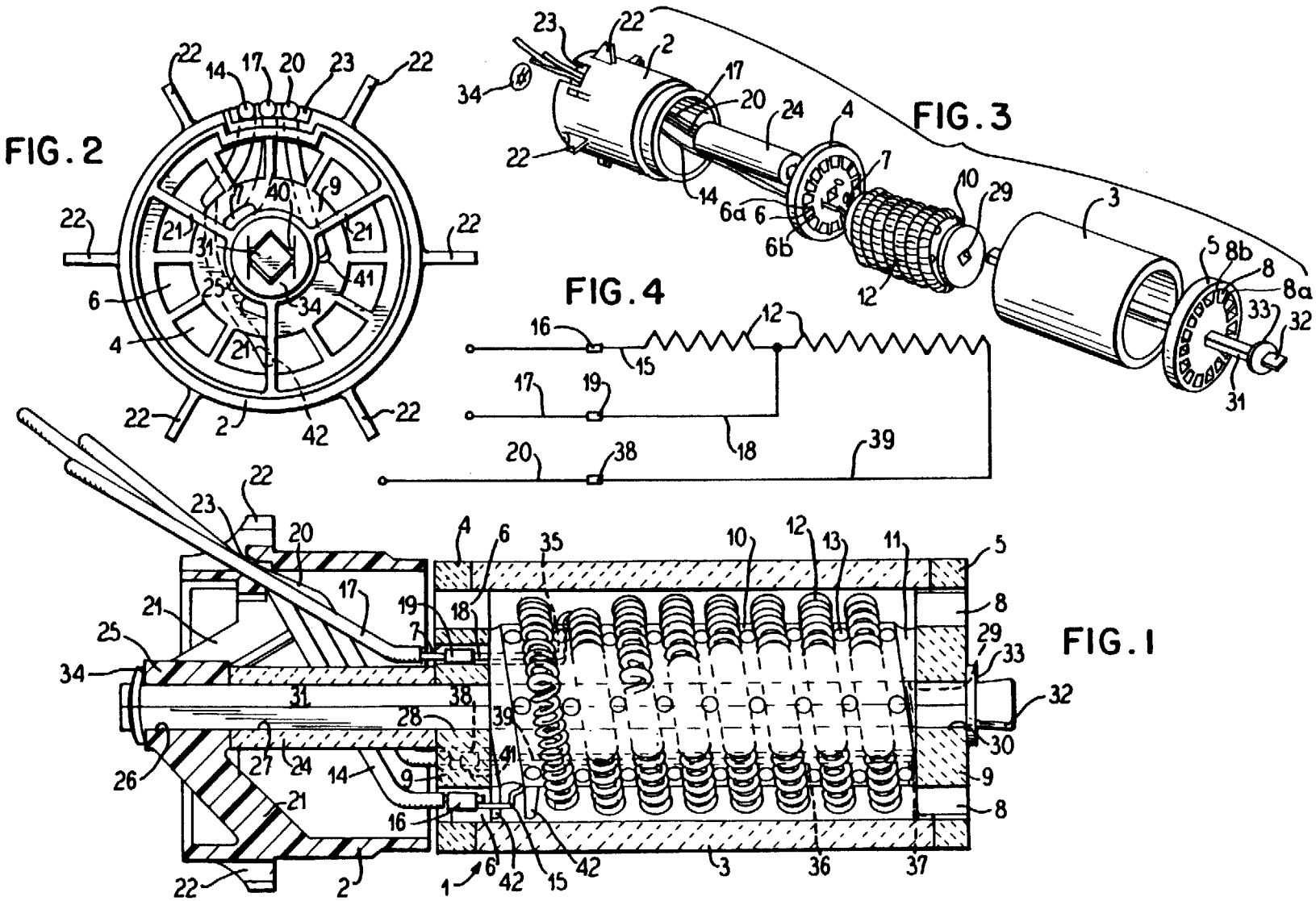
FIG. 1 is a sectional view of a heating coil assembly constructed in accordance with the principles of the present invention.
FIG. 2 is an end view of the heating coil assembly shown in FIG. 1.
FIG. 3 is an exploded perspective view of the heating coil assembly shown in FIG. 1.
FIG. 4 is a circuit diagram for the heating coil in the assembly shown in FIG. 1.

A heating coil assembly constructed in accordance with the principles of the present invention is generally referenced at 1 in FIG. 1. The assembly 1 has an annular support element 2, which may be comprised of plastic, and a hollow cylindrical ceramic sleeve 3 closed at each end by respective ceramic end caps 4 and 5. Each end cap 4 and 5 has an outer rim and a central hub 9 from which a plurality of struts or vanes, such as 6a and 6b that radially extend so as to define a plurality of annularly disposed openings vents or radial apertures 6 in the end cap 4, and the like plurality of vanes such as 8a and 8b define openings or vents radial apertures 8 in the end cap 5. The hubs 9 for each of the end caps 4 and 5, and the vanes radially extending therefrom, extend slightly into the interior of the ceramic sleeve 3 so as to form a shoulder in combination with the outer rim of the caps 4 and 5 so as to provide a ceramic insulating shell or housing in combination with the sleeve 3. A ceramic core 10 is centrally disposed within the interior of the housing formed by the sleeve 3 and the end caps 4 and 5. The core 10 has a helical groove 11 formed thereon which receives a helical spiral heating coil 12. The heating coil 12 is of the type well known to those skilled in the art and may consist, for example, of heavy gauge resistance wire. The flights of the coil 12 may be further separated and insulated by small projections 13 on the core 10.

As shown in the circuit diagram in FIG. 4, the coil 12 has a center tap 18 and two end terminals 15 and 39. The center tap 18 is guided within a radial slot 35 in the core 10 to the end of the core 10, at which point the wire 18 enters an aperture 7 in the end cap 4 and is connected to an exterior wire 17 by a connector 19. One end terminal 15 of the coil 12 is received and retained between two spaced posts 42 formed on the core 10 and is conducted through one of the apertures 6 in the end cap 4, wherein it is connected to another exterior wire 14 by another connector 16. The other end terminal 39 of the coil 12 extends through an axial channel 36 within the core 10, the channel 36 terminating in a radial slot 37 adjacent the end cap 5. The wire 39 is conducted through the channel 36 and the slot 37 for connection to the coil 12. The opposite end of the terminal 39 is conducted through another opening 41 in the end cap 4 wherein it is connected to another exterior wire 20 by means of another connector 38.

The annular support element 2 has a plurality of exterior vanes 22 radially disposed around the periphery thereof for positioning and retaining the support element 2, and the remainder of the assembly connected thereto, in a housing (not shown) of the blower device in which the heating coil assembly 1 is to be employed. The annular support element 2 further has a centrally disposed boss 25 from which a plurality of ribs or struts 21 radially extend toward the outer rim thereof. The outer rim has a passage 23 for permitting the exterior wires 14, 17 and 20 to exit for connection to a power source.

A cylindrical spacer 24, which may also be comprised of ceramic material, extends centrally through the annular support element 2 between the boss 25 and the end cap 4. The entire assembly is held together, and the relative positions of the elements fixed, by a retainer 31 in the form of heavy gauge square wire. The retainer 31 is swaged at one end 32 thereof. Elements 2, 4, 5, 10 and 24 of the assembly 1 have a centrally disposed square bore for receiving the retainer 31. The end cap 5 has a centrally disposed square bore 30, the core 10 has a centrally disposed square bore 30, the end cap 4 has a centrally disposed square bore 28 and the boss 25 of the annular support element 2 has a centrally disposed square bore 26. The spacer 24 has a centrally disposed bore 27, which may be square or circular, since it is not absolutely necessary to radially restrain the spacer 24. A washer 33 is disposed between the swaged end 32 of the retainer 31 and the end cap 5. The opposite free end of the retainer 31 extends slightly beyond the boss 25 and has a press fit retaining washer 34, such as a Tinnerman nut, forced thereon. The washer 34 has a correspondingly shaped opening 40 therein and is slightly bowed such that once in place the edges of the opening 40 provides sufficient friction against the retainer 31 so as to hold all of the elements together. The elements are thus easily longitudinally fixed in relative position, and the square cross section of the retainer 31 received in the respective square bores simultaneously radially fixes the relative positions of the elements. It will be understood that although the retainer 31 is shown as having a square cross section, any polygonal cross section which prevents radial rotation can be employed, such as a hex, triangle, D-shape, or the like, the bores of the respective components through which the retainer 31 extends being correspondingly shaped.

The entire assembly 1 can thus be easily assembled without the necessity of time-consuming adjustment of the various elements. The coil 12 can be wound on the core 10 and the leads extending therefrom easily inserted appropriately through the end cap 4, after which all elements can be placed in succession on the retainer 31 as shown in the exploded view of FIG. 3. The entire assembly can then be appropriately inserted within the blower device in which it is to be used.

Although modifications and changes may be suggested by those skilled in the art it is the intention of the inventors to embody within the patent warranted hereon all changes and modifications as reasonably and properly come within the scope of their contribution to the art.

We claim as our invention:

1. A heating coil assembly for use in a heavy duty hot air blower comprising:

an axially elongated ceramic core;

a heating coil [helically] wound on said core and having a plurality of electrical leads;

an axially elongated hollow ceramic sleeve surrounding and spaced from said core and coil and defining an axial air flow passage between said sleeve and said core about said coil;

a pair of ceramic end caps having a plurality of radial vanes defining axial apertures aligned with said air flow passage disposed at opposite ends of said core and coil and forming in combination with said sleeve a ceramic insulating shell completely surrounding said core and coil, at least one of said leads extending through said apertures in one of said end caps;

an annular support element disposed adjacent said one of said end caps and receiving said leads;

each of said core, said end caps and said annular support element having a centrally disposed [non-circular]bore therein; and a retainer *means* having a non-circular crossection] *cross-section corresponding to the cross-section of said bore extending through said core, said end caps and said annular support element for* [simultaneously] axially [and radially fixing and] restraining said core, said end caps and said annular support element.

2. A heating coil assembly as claimed in claim 1 wherein each of said end caps comprises:

an outer rim;

a centrally disposed hub through which said [polygonal] bore extends; and said radially extending vanes connecting said rim and said hub.

3. A heating coil assembly as claimed in claim 2 wherein said vanes and said hub have a larger axial dimension than said rim so as to extend into said hollow ceramic sleeve.

4. A heating coil as claimed in claim 1, wherein said plurality of electrical leads is three, and wherein said ceramic core has a first slot therein for receiving a first and said leads, an axial channel extending along the entire length of said core for receiving a second of said leads therein along the length of said core, and a pair of spaced radially extending posts disposed on an exterior of said core at an end thereof adjacent said one of said end caps for receiving a third of said leads.

5. A heating coil assembly as claimed in claim 4 wherein said ceramic core further includes a second slot disposed at an opposite end of said core from said first slot, said channel for said second lead communicating with said second slot for bringing said second lead to said exterior of said core.

6. A heating coil assembly as claimed in claim 1 wherein said annular support element has a means for connecting said support element to a hot air blower.

7. A heating coil assembly as claimed in claim 1 wherein said annular support element comprises:

an exterior rim;

a centrally disposed boss through which said retainer *means* extends; and a plurality of radially extending struts connecting said rim and said boss.

8. A heating coil assembly as claimed in claim 7 further comprising a spacer disposed in said annular support element between said boss and said one of said end caps, said spacer having a centrally disposed bore through which said retainer *means* extends.

9. A heating coil assembly as claimed in claim 8 wherein said spacer is comprised of ceramic material.

10. A heating coil assembly as claimed in claim 1 further comprising means disposed at opposite ends of said retainer *means* for restraining axial movement of said retainer *means* relative to said core, support element, end caps and sleeve.

11. A heating coil assembly as claimed in claim 10 *wherein said retainer means is a shaft extending through said bores in said core, said end caps and said annular support element, and* wherein said means for restraining axial movement of said retainer [include] *means is* a swaged end of said [retainer] *shaft.*

12. A heating coil assembly as claimed in claim 10 *wherein said retainer means is a shaft extending through said bore in said core, said end caps and said annular support element, and* wherein said means for restraining axial movement of said retainer [includes] *means is* a press fit retaining washer disposed at one end of said [retainer] *shaft* adjacent said annular support element.

13. A heating coil assembly for use in a heavy-duty hot air blower comprising:

an elongated ceramic core having an outer circumferential surface having a [helical] groove therein extending from one axial end of said core to an opposite axial end of said core;

a heating element [helically] wound about said core in said groove, [said groove having a depth less than a radial height of said heating element such that said heating element projects above said outer circumferential surface of said core,] said heating element having a plurality of leads;

an elongated sleeve surrounding said core and having an inner surface spaced from said outer circumferential surface defining an annular axial air flow space between the core and the sleeve, two ends caps respectively disposed at said axial ends of said core, said end caps having means for maintaining the spacing of said inner surface from said outer circumferential surface, each end cap having a plurality of radial vanes defining axial apertures in said end caps in axial registry with said air flow space, and at least one end cap further having means for providing access for at least one of said heating element leads to an exterior of said assembly; and means for axially retaining said end caps in assembled relation with said core and said sleeve [and having means cooperating with means on said core and said end caps for preventing relative rotational movement thereof].

14. A heating coil assembly as claimed in claim 13, wherein each end cap consists of ceramic material.

15. A heating coil assembly as claimed in claim 13, wherein said sleeve consists of a ceramic material.

16. A heating coil assembly as claimed in claim 13, wherein the plurality of leads for said heating element is three, two of said leads being electrically connected to opposite ends of said coil at opposite ends of said core, and one of said leads being electrically connected to said coil at an intermediate position along the axial length of said core.

17. A heating coil assembly as claimed in claim 13, wherein said means in at least one end cap for providing access for at least one of said heating element leads to an exterior of said assembly is an axial opening in said one of said end caps.

18. A heating coil assembly as claimed in claim 17, wherein one of said leads for said heating element extends through said axial opening and wherein another of said heating element leads extends through one of said axial apertures defined by said radial vanes.

19. A heating coil assembly as claimed in claim 13, wherein said means for [axial] *axially* retaining said end caps in assembled relation is a shaft extending axially through respective centrally disposed bores in said end caps and said core with opposite ends of said shaft projecting beyond said end caps, and a pair of axially stationary washers disposed at said projecting ends of said shaft.

20. A heating coil assembly as claimed in claim [19] *29, wherein said means for axially retaining is a shaft extending axially through respective centrally disposed bores in said end caps and said core, and wherein said shaft and said bores have corresponding non-circular cross-sections serving as said means cooperating with means on said core and said end caps for preventing relative rotational movement thereof.*

21. A heating coil assembly as claimed in claim 13, wherein each of said end caps has a circular projection received at opposite ends of said sleeve for radially fixing the position of said end caps relative to said sleeve.

22. A heating coil assembly as claimed in claim 13, further comprising a support element disposed adjacent said one of said end caps, and wherein said means for axially retaining said end caps in assembled relation with said core and said sleeve additionally retains said support element in assembled relation therewith.

23. A heating coil assembly as claimed in claim 22, wherein said support element has *an aperture therein and has* a centrally disposed boss within *said* aperture [therein], and wherein said means for axially retaining said end caps, said sleeve and said support element in assembled relation is a shaft extending axially through said boss, said end caps and said core, and further comprising a spacer surrounding said shaft disposed in the interior of said support element between *said* one of said end caps and said boss.

24. A heating coil assembly as claimed in claim 23, wherein said spacer consists of a ceramic material.

25. A heating coil assembly for use in a heavy-duty hot air blower comprising:

an elongated ceramic core having an outer circumferential surface having a [helical] groove therein extending from one axial end of said core to an opposite axial end of said core;

a heating element [helically] wound about said core in said groove, [said groove having a depth less than a radial height of said heating element such that said heating element projects above said outer circumferential surface of said core,] said heating element having a plurality of leads;

an elongated sleeve surrounding said core and having an inner surface spaced from said outer circumferential surface defining an annular axial air flow space between the core and the sleeve, two ends caps respectively disposed at said axial ends of said core, said end caps having means for maintaining the spacing of said inner surface from said outer circumferential surface, each end cap having a plurality of radial vanes defining axial apertures in said end caps in axial registry with said air flow space;

means for providing access for at least one of said heating element leads to an exterior of said assembly; and means for axially retaining said end caps in assembled relation with said core and said sleeve [and having means cooperating with means on said core and said end caps for preventing relative rotational movement thereof].

*26. A heating coil assembly as claimed in claim 1 further comprising:*

*means for preventing relative rotation of said core and said end caps.*

*27. A heating coil assembly as claimed in claim 26 wherein said retainer means is a shaft extending through said bore in said core, said end caps and said annular support element, and wherein said shaft and said bores have corresponding non-circular cross-sections serving as said means for preventing relative rotation.*

*28. A heating coil assembly as claimed in claim 1 wherein said coil is helically wound on said core.*

*29. A heating coil assembly as claimed in claim 13 further comprising:*

*means on said means for axially retaining cooperating with means on said core and said end caps for preventing relative rotational movement thereof.*

*30. A heating coil assembly as claimed in claim 13 wherein said groove is a helical groove.*

*31. A heating coil assembly as claimed in claim 13 wherein said groove has a depth less than a radial height of said heating element such that said heating element projects above said outer circumferential surface of said core.*

*32. A heating coil assembly as claimed in claim 25 further comprising:*

*means on said means for axially retaining cooperating with means on said core and said end caps for preventing relative rotational movement thereof.*

*33. A heating coil assembly as claimed in claim 32 wherein said means for axially retaining is a shaft extending axially through respective centrally disposed bores in said end caps and said core, and wherein said shaft and said bores have corresponding non-circular cross-sections serving as said means cooperating with means on said core and said end caps for preventing relative rotational movement thereof.*

*34. A heating coil assembly as claimed in claim 25 wherein said groove is helical.*

*35. A heating coil assembly as claimed in claim 25 wherein said groove has a depth less than a radial height of said heating element such that said heating element projects above said outer circumferential surface of said core.*

* * * * *